Patented Feb. 9, 1932

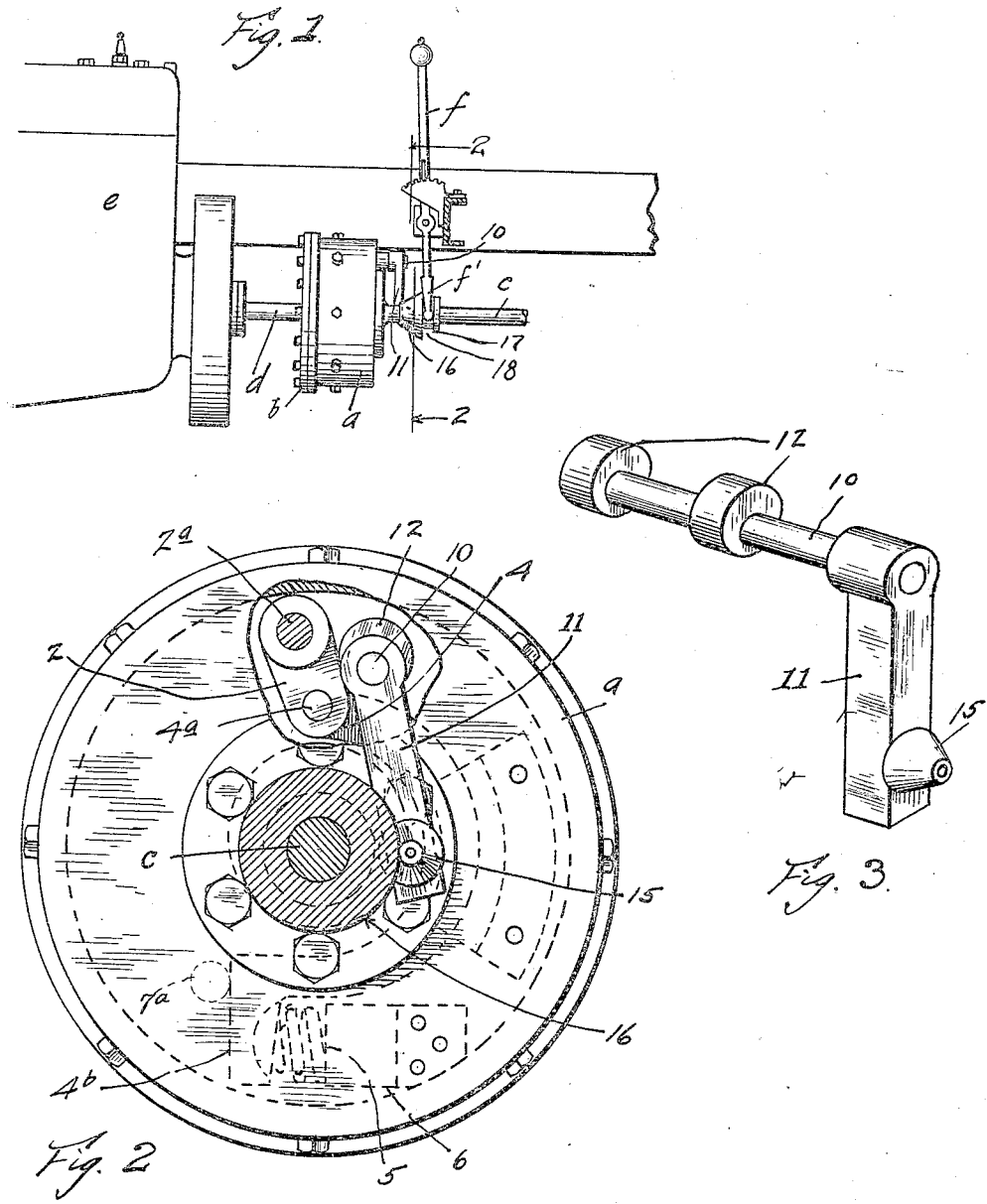

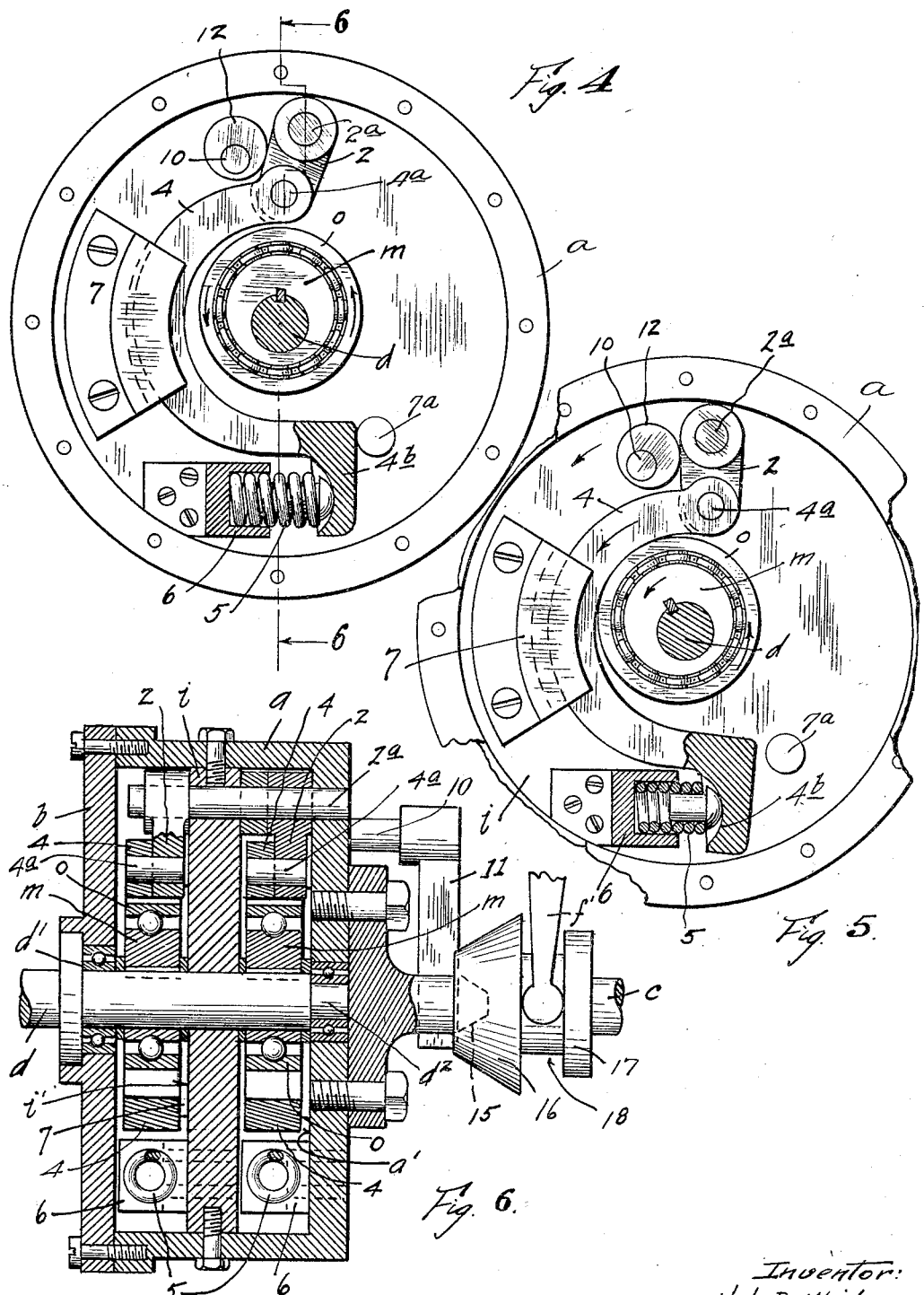

1,844,116

UNITED STATES PATENT OFFICE

HAL DE WAIDE, OF PORTLAND, OREGON

VARIABLE MOTION TRANSMISSION

Application filed October 29, 1927. Serial No. 229,618.

My invention relates to variable motion transmission, especially as related to motor vehicles.

Heretofore, variable motion transmission has been attained in motor vehicles in the combination of a friction clutch and selective gearing.

The present means, as used, have a number of disadvantages. The clutching mechanism, which is engageable by friction, wears rapidly, acts unevenly, and engages suddenly as the engine picks up its load, all of which is unsatisfactory and injurious to the motor vehicle. The selective gear transmission also wears rapidly and is noisy when it is even slightly worn, and the portions of the selective gearing not in use, which idle on their respective counter-shafts, cause excessive wear of the parts of the transmission and impose an added and useless load on the engine.

Further, the operation of the selective feature of the gear transmission is comparatively difficult and inconvenient and the construction of the gear transmission as a whole is complex and expensive to manufacture. Furthermore, the gear transmission functions to transmit power continuously from the driven to the driving member, and such continuous transmission tends to over-load the engine, when the load increases, as when climbing a hill—due to the continuous drag of the load on the engine, which reduces its momentum and does not permit the engine to accelerate itself to carry its increased load.

The principal object of my invention is to provide a simple and efficient variable motion transmission consisting of few parts and no friction surfaces nor inter-meshing gears, which will function both as a clutch and as a selective transmission, by the means of an eccentric member co-acting with a concentric member, the eccentric member adapted to be brought into variable co-action with the concentric member, whereby the eccentric member will by-pass the concentric member in certain positions of the latter thus only transmitting power for a portion of each revolution of the driving shaft, and permitting the driving member to accelerate to more efficiently carry its load for a portion of the next rotation. Also by this construction, I provide a more or less flexible connection between the driving and driven members, which will tend to absorb the shocks of sudden acceleration or deceleration of the engine.

Another object of my invention is to provide a variable power transmission which will be operable by a single lever of convenient design and which will permit the selection of the driving ratio of the transmission to be made by merely bringing the driving and driven members of the transmission into closer spaced relation with one another.

That is, I provide a variable transmission operable from a neutral position, in which the engine will be disconnected from the transmission, through a position equivalent to the low gear of the selective gear transmission, to a position at its other extreme, equivalent to the high gear of the selective gear transmission.

I attain my objects in a variable transmission comprising a driving member and a driven member, a clutch mechanism for connecting said members, the said clutch mechanism comprising an eccentric element, carried by one of the members, the cooperating element of said clutch mechanism carried by the other of said members. The said cooperating clutch element is adapted to be placed in engagement with the eccentric element, and provided with means for releasably holding the cooperating clutch element in engagement with variable pressure, whereby as the said pressure is varied, the driving, clutch member will engage the driven member for a greater or less portion of each revolution.

These and other incidental features of my invention and the details of construction, and operation thereof are hereinafter described with reference to the accompanying drawings, in which:

Fig. 1 shows a diagrammatic side view of my transmission connected with an engine and the controlling mechanism thereof;

Fig. 2 shows an enlarged section taken on the line 2—2 of Fig. 1, looking in the direction of the arrows and illustrates by a portion of the casing broken away, the arrangement of the mechanism enclosed;

Fig. 3 shows a perspective view of the control shaft and the eccentric cams carried thereby;

Fig. 4 shows an end view of my transmission with the face plate removed, disclosing the details of construction and illustrates the mechanism in a disengaged position;

Fig. 5 shows a similar view to Fig. 4, except that the mechanism is in an engaged position;

Fig. 6 shows a section taken on the line 6—6 of Fig. 4 looking in the direction of the arrows and illustrates further details of construction.

Referring now to the figures of the drawings, my variable transmission comprises a casing $a$ provided with a removable face plate $b$, and concentrically mounted fast on the end of a driven shaft $c$. A driving shaft $d$ in axial alinement with the shaft $c$ is journaled within the said casing. The shaft $d$ is driven by an automobile engine $e$ in the usual manner, Fig. 1, and control devices hereinafter described are provided, operable by means of a suitable hand or foot lever, a hand lever $f$ being shown in the drawings.

A partition $i$ transverse of the axis of rotation of the casing $a$ is centrally fixed in the casing and the driving shaft $d$ extends through the face plate and the partition $i$ and is journaled therein as at $d'$ and $d2$. On each side of the partition are keyed eccentric circular discs $m$ on the shaft $d$, over which are mounted anti-friction bearings $o$.

On the face $i'$ of the partition $i$ and the inner face $a'$ of the wall of the casing $a$ are links 2 pivotally mounted on pins $2a$. The other ends of the links 2 are pivotally connected to U-shaped levers or bars 4 by means of pins $4a$, Figs. 4 and 5, which are arranged so that the eccentric discs $m$ are contained within the sides of the said levers. The other ends of the levers 4 are provided with outwardly curved sockets $4b$ against which stiff expansion coil springs 5 bear, which are seated in containers 6 fixed to the partition $i$ and the wall $a'$ respectively.

Guides or stops 7 are fixed to the partition $i$ and the wall $a'$ adjacent the outside of the middle of the levers 4. Similar stops $7a$ are provided adjacent the socket ends $4b$ of the arms 4, to limit the inward movement of the said arms to the extreme inward movement imparted by the springs 5.

A shaft 10, Fig. 3, provided with a crank arm 11 and with two spaced eccentric cams 12, is rotatably mounted in the casing parallel with the shaft $d$ and adjacent the links 2 so that the cams 12 will bear against the said links.

The crank arm 11 is provided on its other end with a conical roller 15 which bears against a conical surface 16 formed on a sliding collar 17, which idles on the shaft $c$ and is provided with an annular groove 18 in which the forked ends $f'$ of the control lever $f$ are arranged. By this means as the lever $f$ is shifted the collar 17 will be moved toward and from the arm 11 moving the arm, as the conical surfaces are brought into greater or less juxtaposition.

In the operation of my transmission, in the neutral or disengaged position, see Fig. 4, the levers 4 are held out of contact with the eccentric discs $n$ by the stops $7a$. And hence no motion is transmitted to the casing $a$ by which the levers 4 are carried.

But when the lever $f$, see Fig. 1, is shifted, the sliding collar 17 will be advanced to bear more closely against the conical roller 15 and cause the arm 11 to rotate the eccentric cams 12, which forces the links 2 and therewith the levers 4 closer to the said eccentric discs $m$, see Fig. 5, so that the said eccentric discs, as they rotate, will be brought to bear against the arms 4 against the tension of the springs 5 and tend to carry them along in their rotation, and hence rotate the casing $a$.

However if the load is sufficient to overcome the strength of the springs 5, the eccentric discs will by-pass the levers 4 and engage similarly during the next revolution, but if the load on the driven member is not sufficient to overcome the resistance of the springs 5, the eccentric discs will carry the levers 4 and the casing with them transmitting motion to the driven shaft, and if the load increases sufficiently to overcome the said springs, the eccentrics will by-pass the levers 4 until equilibrium is reached again.

The by-passing of the eccentrics over the levers 4 also serves as a speed reduction means, permitting the driving shaft to rotate faster than the driven shaft, thus transmitting increased power and serving as a shock absorbing means for the shocks transmitted from the engine due to sudden acceleration or deceleration of the said engine.

In Fig. 5 is shown the levers 4 advanced by the lever $f$ until it is in an extreme or locked position with the eccentrics, the springs 5 being entirely compressed, and such position is equivalent to the high gear of the selective gear transmission, since it is then a direct drive.

By providing anti-friction bearings $o$ on the eccentrics which are free to rotate about them, there is no friction or wiping action of the ecentrics against the levers 4 and thus a film of lubricant can always be retained between the bearing portions, and excessive wear eliminated.

As self evident my above described device may be employed as a braking mechanism equally well as a power transmission mechanism.

I claim:

1. In a variable motion transmission, a driving shaft, a driven shaft, a clutch of which the driving shaft and the driven shaft carry cooperating elements, respectively, one of said clutch elements being arranged eccentrically with respect to the axis of rotation of the shaft by which this clutch element is carried, the clutch element carried by the other shaft consisting of a rockable bar, a resilient support for one end of said bar; and means for moving the other end of said bar toward and from the orbit of motion of said eccentric clutch element, thereby to place the clutch element into and out of engagement with variable force.

2. In a variable motion transmission, a driving shaft, a driven shaft, a clutch of which the driving shaft and the driven shaft carry cooperating elements, respectively, one of said clutch elements being arranged eccentrically with respect to the axis of rotation of the shaft by which this clutch element is carried, the clutch element carried by the other shaft consisting of a U-shaped, rockable bar, a resilient support for one end of said bar; and means for moving the other end of said bar toward and from the orbit of motion of said eccentric clutch element, thereby to place the clutch element into and out of engagement with variable force.

3. In a variable motion transmission, a driving shaft, a driven shaft, a clutch of which the driving shaft and the driven shaft carry cooperating elements, respectively, one of said clutch elements being arranged eccentrically with respect to the axis of rotation of the shaft by which this clutch element is carried, the clutch element carried by the other shaft consisting of a U-shaped rockable bar, a resilient support for one end of said bar; and means for moving the other end of said bar toward and from the orbit of motion of said eccentric clutch element, thereby to place the clutch element into and out of engagement with variable force.

4. In a variable motion transmission, a driving shaft, a driven shaft, a clutch of which the driven shaft and the driving shaft carry cooperating elements, respectively, one of said clutch elements being arranged eccentrically with respect to the axis of rotation of the shaft by which the clutch element is carried, the clutch element carried by the other shaft consisting of a rockable bar, means normally operatively positioning said bar relatively to the orbit of motion of said eccentric clutch element, and means for operating said bar, whereby to place the clutch elements into and out of engagement with variable force.

5. In a variable motion transmission, a driving shaft, a driven shaft, a clutch of which the driven shaft and the driving shaft carry cooperating elements, respectively, one of said clutch elements being arranged eccentrically with respect to the axis of rotation of the shaft by which the clutch element is carried, the clutch element carried by the other shaft consisting of a rockable bar, means normally yieldingly positioning said bar relatively to the orbit of motion of said eccentric clutch element, and means for operating said bar, whereby to place the clutch elements into and out of engagement with variable force.

6. In a variable motion transmission, a driving shaft, a driven shaft, a clutch of which the driven shaft and the driving shaft carry cooperating elements, respectively, one of said clutch elements being arranged eccentrically with respect to the axis of rotation of the shaft by which the clutch element is carried, the clutch element carried by the other shaft consisting of a U-shaped rockable bar, means normally operatively positioning said bar relatively to the orbit of motion of said eccentric clutch element, and means for operating said bar, whereby to place the clutch elements into and out of engagement with variable force.

7. In a variable motion transmission, a driving shaft, a driven shaft, a clutch of which the driven shaft and the driving shaft carry cooperating elements, respectively, one of said clutch elements being arranged eccentrically with respect to the axis of rotation of the shaft by which the clutch element is carried, the clutch element carried by the other shaft consisting of a U-shaped rockable bar, means normally yieldingly positioning said bar relatively to the orbit of motion of said eccentric clutch element, and means for operating said bar, whereby to place the clutch elements into and out of engagement with variable force.

8. In a variable motion transmission, a driving shaft, a driven shaft, a clutch of which the driving shaft and the driven shaft carry cooperating elements, respectively, one of said clutch elements being arranged eccentrically with respect to the axis of rotation of the shaft by which this clutch element is carried, the clutch element carried by the other shaft consisting of a rockable bar, a resilient support for one end of said bar; and means for moving the said bar toward and from the orbit of motion of said eccentric clutch element, thereby to place the clutch element into and out of engagement with variable force.

HAL DE WAIDE.